(No Model.)
C. COURT.
OPERATING ON AND TREATMENT OF VEGETABLE FIBROUS SUBSTANCES.
No. 333,731. Patented Jan. 5, 1886.
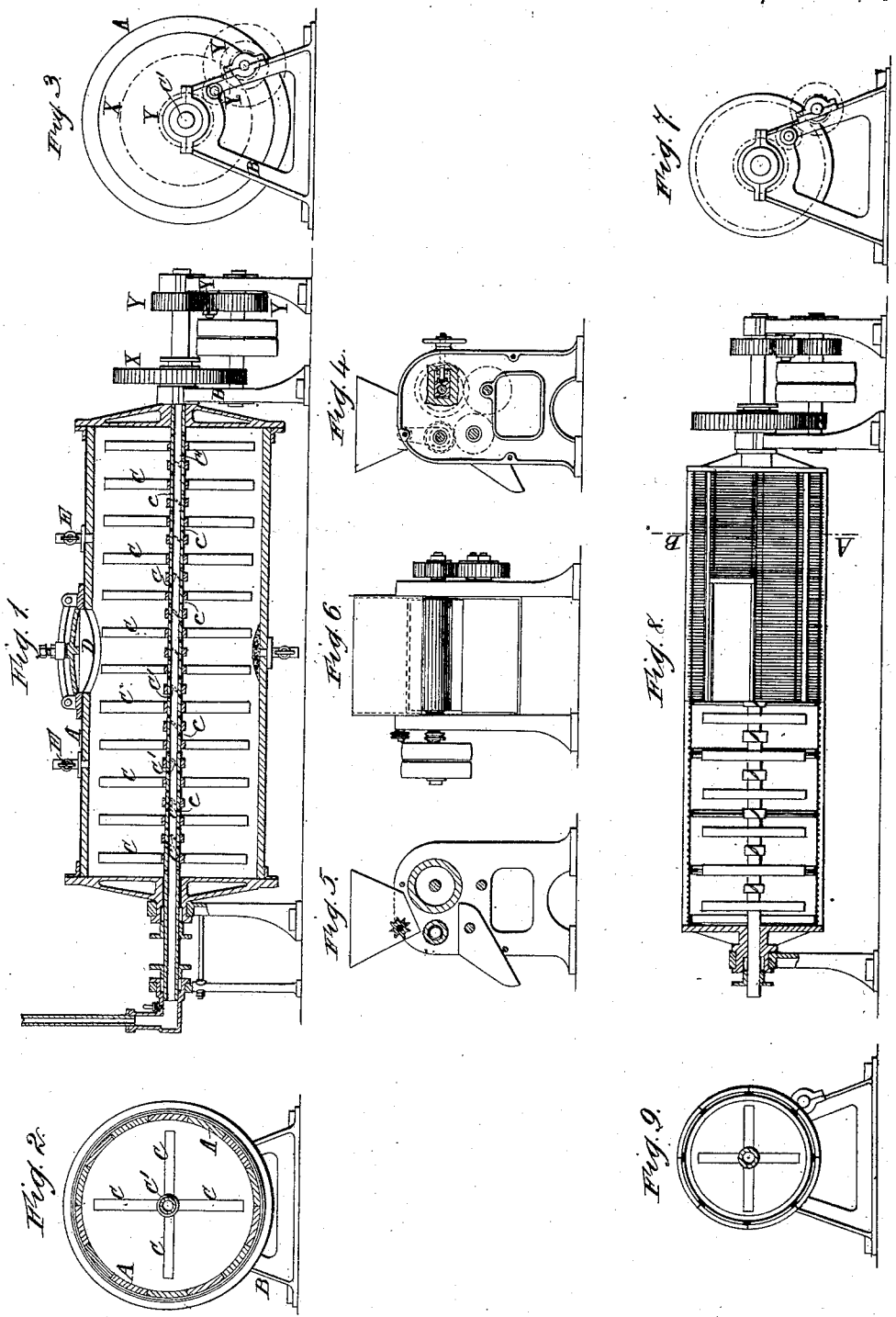

UNITED STATES PATENT OFFICE.

CHARLES COURT, OF LONDON, ENGLAND, ASSIGNOR TO SIDNEY HERSEE, HERBERT CHARLES WILLIAMS, AND SIDNEY HERSEY, ALL OF SAME PLACE.

OPERATING ON AND TREATMENT OF VEGETABLE FIBROUS SUBSTANCES.

SPECIFICATION forming part of Letters Patent No. 333,731, dated January 5, 1886.

Application filed October 31, 1885. Serial No. 181,529. (No model.) Patented in England February 24, 1883, No. 1,004; in France August 1, 1883, No. 156,826; in Belgium August 7, 1883, No. 62,252; in Canada September 29, 1883, No. 17,779; in Italy September 30, 1883, XVII, 15,817, and XXXI, 307, and in Austria-Hungary November 10, 1884, No. 38,906 and No. 38,975.

*To all whom it may concern:*

Be it known that I, CHARLES COURT, a subject of the Queen of Great Britain, residing at London, England, have invented new and useful improvements in operating on and treatment of vegetable fibrous substances to make half-stuff to be used in the manufacture of paper and mill-boards, of which the following is a specification.

I do not claim any fibrous vegetable as a new material or new in use for the manufacture of half-stuff for paper-making, as there are scarcely any, if any, vegetable fibers which have not been tried in some way or other for that purpose, but which have failed or partially so by reason of the imperfect and ineffectual mode of treating them.

My invention consists in my improved mode or means of operating on and treatment of fibrous vegetable substances in combination to make half-stuff for paper-making, and for that purpose, by preference, I employ spent tan from the tan-yards in combination with spent hops, which for the purpose of making white or light-colored paper I prefer from ale-brewing, but for brown or dark-colored I can use hops used for porter or dark beer, and I have found it advantageous to keep such spent hops for some weeks, in order to sour or ferment before they are used in combination according to my invention and the fibers of flax or hemp, and of which, as a matter of economy, I use the waste flax or hemp, and treat them according to my invention as follows: I have each of these substances or materials cleansed and washed separately, preferably by steam in a rotary cylindrical machine having a hollow metal spindle through it with beaters thereon, and the spindle being sufficiently perforated to allow the steam to pass through the perforations into the cylinder.

Such an apparatus as I have found suitable for this purpose is represented in Figures 1, 2, and 3 on Sheet 1 of the drawings herewith annexed, Fig. 1 showing a side view in section, Fig. 2 a sectional end view, and Fig. 3 an elevation.

The cylinder marked A is mounted on standards B B, so as to be capable of being re-volved in one direction by the toothed wheel X, while the beaters C C C are driven in the opposite direction at a much greater speed by the gearing Y. The axle C', on which the beaters C are fixed, is a tube of brass or metal which will not rust from moisture or alkali, and through this tube steam is introduced to the cylinder through the holes $c\ c\ c\ c$. The materials to be washed are introduced to the cylinder through the man-hole D, the cover of which must be removed for the purpose. The steam may be let out from the cylinder through the taps E E, and the water produced by condensation of the steam by the tap F. This cylinder I prefer to have made of wood strongly bound and hooped. After the substances or materials have been sufficiently cleansed they are removed from the cylinder of this machine, and I have the water or moisture pressed out of them by hydraulic press or other suitable means, and I then have the tan crushed between rollers, one of which may be smooth and the other slightly corrugated, or both smooth, and which I prefer to be of unequal diameter, so as to work at different speeds, and to give a rubbing action to open up the fibers.

Such an apparatus as I have found suitable for the purpose is represented in Figs. 4, 5, and 6, of which Fig. 4 is an end elevation, Fig. 5 an end section, and Fig. 6 a side elevation. The substances or materials thus treated are then separately steamed in a revolving cylinder, constructed as hereinbefore described in Figs. 1, 2, and 3 of the drawings, and having therein a chemical solution of about twenty-eight pounds of caustic soda dissolved in twelve gallons of hot water for each ton of spent tan, hemp, flax, jute, manila, or esparto grass, and for spent hops about twenty-eight pounds of soda-ash dissolved in twelve gallons of hot water for each ton of the spent hops. I keep the materials under treatment with the above chemicals until the fibers are completely opened up, which takes place on an average of from one to two hours, according to the quality and nature of the fibrous materials in the course of treatment. The proportions of tan, spent hops, and hemp, flax, jute, manila, esparto grass, or suitable vegetable fiber will depend on the kind of half-stuff required; but as a general principle I use one part of spent tan, by weight, to one part of spent hops, by weight, and two parts of fibers of hemp, flax, jute, manila, esparto grass or any other vegetable fiber known to be suitable for making half-stuff, by weight.

For spent tan and for hemp, flax, or other such fibers I use, as hereinbefore stated, caustic soda as a chemical, and for the spent hops I use soda-ash; but I do not claim or limit myself to these chemicals, or to the proportions hereinbefore stated, as chemicals for such purposes are well known.

The object of separately or at separate times using the apparatus for steaming, or otherwise treating, is to prevent as far as practicable the coloring-matter from either of the substances staining or discoloring the others.

It has been found difficult, in fact almost impracticable, to remove or get rid of the knots or hard substances in the spent tan, and to effect that object I put the tan, after it has been treated as above stated, into a rotary cylindrical wire sieve having meshes of about half an inch in diameter, driven rapidly by steam or other motive power, and a spindle through it with arms or beaters thereon to remove or crush the knots and hard substances. As a general principle, I have the cylindrical revolving sieve about eight feet long, and about two feet six inches in diameter, on suitable standards; but the capacity will of course be according to the quantities required to be operated on.

Such an apparatus as I have found suitable for my purpose is represented in Figs. 7, 8, and 9, of which Fig. 7 is an end elevation, Fig. 8 a side view partly in section, and Fig. 9 a section through the lines A B in Fig. 8, and these figures will sufficiently describe the apparatus. After the tan has been removed from this sieve and again washed and drained it is put with the hops and hemp, flax, jute, manila, esparto grass, or other suitable vegetable fibers which have been treated into a revolving cylinder called a "mixer," with arms or beaters on a spindle therein to commix and combine the substances. The apparatus shown in Figs. 1, 2, and 3 can be suitably used for the purpose without using the appliances for introducing steam to the cylinder. The combined material produced by this commixture is then removed therefrom and compressed in quantities as may be desired, and is then half-stuff, ready for the use of paper-makers.

In some cases I operate on and treat according to my invention spent tan in combination with spent hops in about the proportion of one part, by weight, of spent tan to two parts, by weight, of spent hops, and in some cases I operate on and treat according to my invention spent tan in combination with the fibers of flax or of hemp or with the fiber of jute, manila, or of esparto grass, or of maize-leaves or other vegetable fiber known to be suitable for paper-making, which, when used as above mentioned, should be in a dry state.

The apparatus which I have shown in the drawings hereunto annexed are such as I have found suitable for my invention, but any known suitable apparatus may also be used for such purposes or processes as I have described. None of the cylinders or other parts which come in contact with the materials should be of iron, unless lined with wood, lead, brass, or other unrustable material.

The substances which have been treated according to my invention can, if required, be bleached in the ordinary manner, and paper can be made at the paper-mills in the usual way with the half-stuff thus prepared, and so can mill-boards.

Having described the nature of my said invention and in what manner the same may be performed, I wish it to be understood that I am aware it has been before proposed to use spent tan and spent hops with other materials for the manufacture of paper, and that English patents were granted to Henry Crosley, dated, respectively, on the 15th day of April, 1839, No. 8,032, and the 13th day of September, 1854, No. 1,994, for the same; but the processes described in the specifications of the said patents would not effect the objects desired. I therefore do not claim such use of spent tan and spent hops with or without other materials in the manufacture of paper, nor do I claim the discovery or use of any fibrous vegetable material separately or any of the apparatus above mentioned; but

What I claim as my invention is—

Fibrous vegetable materials operated on and treated separately and afterward combined together in the mode or manner substantially as hereinbefore described, for the purpose of producing half-stuff.

C. COURT.

Witnesses:
 G. F. REDFERN,
 F. W. PRICE.